US006950631B2

(12) United States Patent
Solbach

(10) Patent No.: US 6,950,631 B2
(45) Date of Patent: Sep. 27, 2005

(54) ACTIVE RECEIVING ARRAY ANTENNA

(75) Inventor: Klaus Solbach, Mülheim (DE)

(73) Assignee: EADS Deutschland GmbH, Ottobrum (DE)

(*) Notice: Subject to any disclaimer, the term of this patent is extended or adjusted under 35 U.S.C. 154(b) by 491 days.

(21) Appl. No.: 10/301,872

(22) Filed: Nov. 22, 2002

(65) Prior Publication Data

US 2003/0151549 A1 Aug. 14, 2003

(30) Foreign Application Priority Data

Nov. 22, 2001 (DE) .......................... 101 57 216

(51) Int. Cl.$^7$ .............................................. H04B 1/16
(52) U.S. Cl. ................... 455/67.14; 455/226.1; 455/232.1; 455/67.11; 455/115.2; 375/316; 375/344; 375/224; 342/368
(58) Field of Search .................. 455/67.11–67.13, 455/67.14, 302, 303–306, 309–312, 226.1, 226.2, 227–230, 232.1, 234.1, 236.1, 242.1, 80–84, 272–279, 13.3, 800, 801, 862.1, 115.1–115.3, 101–107; 342/368, 371–374, 194–197; 375/246, 216, 344–348, 224, 373

(56) References Cited

U.S. PATENT DOCUMENTS

| 5,412,414 | A | | 5/1995 | Ast et al. | |
|---|---|---|---|---|---|
| 6,005,515 | A | * | 12/1999 | Allen et al. | ............... 342/374 |
| 6,625,424 | B1 | * | 9/2003 | Mohindra | ............... 455/84 |
| 2003/0176174 | A1 | * | 9/2003 | Seppinen et al. | ..... 455/226.1 |
| 2003/0186664 | A1 | * | 10/2003 | Shah | ............... 455/232.1 |
| 2003/0186725 | A1 | * | 10/2003 | Miya et al. | ............... 455/561 |
| 2003/0206603 | A1 | * | 11/2003 | Husted | ............... 375/324 |
| 2003/0224747 | A1 | * | 12/2003 | Anand | ............... 455/208 |
| 2004/0002318 | A1 | * | 1/2004 | Kerth et al. | ............... 455/302 |
| 2004/0137870 | A1 | * | 7/2004 | Kivekas et al. | ............ 455/326 |

FOREIGN PATENT DOCUMENTS

| DE | 199 41 473 A1 | 3/2000 |
|---|---|---|
| WO | WO 99/31755 | 6/1999 |

OTHER PUBLICATIONS

A Dreher, T. Hekmat, N.E. Niklasch, M. Lieke, F. Klefenz, and A. Schroth, "Planar Digital–Beam Forming Antenna for Satellite Navigation," in IEEE MTT–S Int. Microwave Symp. Dig., Anaheim, CA, Jun. 1999, pp. 647–650.
Stephen A. Maas: "The RF and Microwave Circuit Design Cookbook," 1998, Archtech House, ISBN 0–89006–973–5 Chapter 6 (Active Mixers).
European Search Report.
M. Case, S.A. Maas, L. Larson, D. Rensch, D. Harame and B. Meyerson, An X–Band Monolithic Active Mixer In SIGe HBT Technology, 1996, pp. 655–658, IEEE MTT–S Digest.
A. Dreher, T. Hekmat, N.E. Niklasch, M. Lieke, F. Klfenz and A. Schroth, Planar Digital–Beamforming Antenna For Satellite Navigation, 1999, pp. 647–650, IEEE MTT–S Digest.

* cited by examiner

Primary Examiner—Pablo N. Tran
(74) Attorney, Agent, or Firm—Crowell & Moring LLP

(57) ABSTRACT

A receiving array antenna with a variety of channels for converting received signals from receiving antenna elements (ANT) into an intermediate frequency signal (ZF) by using a circuit having one or several preamplifiers (LNA) and a mixer (MIX) connected in series, whereby a centrally generated local oscillator signal (LO) and calibration signal (CAL) are supplied to the circuit. A common distribution network (VNG) is available for the central oscillator signal (LO) and calibration signal (CAL), which is interconnected in such a way that the central local oscillator signal (LO) and calibration signal (CAL) is coupled into the circuit at the output of the receiving antenna element (ANT).

13 Claims, 5 Drawing Sheets

ACTIVE RECEIVING ARRAY ANTENNA

BACKGROUND AND SUMMARY OF THE INVENTION

This application claims the priority of Germany Application No. 101 57 216.6-35, filed Nov. 22, 2001, the disclosure of which is expressly incorporated by reference herein.

The invention concerns a receiving array antenna for converting received signals from antenna elements into an intermediate frequency signal.

In active receiving array antennas, which usually consist of individual elements or subgroup elements, the received signals (radio frequency (RF) or high frequency signals (HF)) are converted to an intermediate frequency range (baseband). Digital or analog signal overlay, so-called "beam forming," generate electronically controlled antenna characteristics in the intermediate frequency or baseband range. For this purpose, a conversion of the signals of the antenna elements or the subgroup elements takes place in a circuit including low-noise preamplifiers and frequency converters (mixer circuits). A local oscillator signal is therefore necessary for operating the mixer circuit and a calibration signal is necessary for the calibration of the entire circuit of the array antenna.

FIG. 1 shows a receiving array antenna with, for example, 4 channels according to the state of art. Each channel K include an antenna element ANT which is connected to a preamplifier, usually a low-noise preamplifier (LNA). A mixer MIX is connected downstream of the preamplifier LNA, and the output of the LNA is connected to the first input of the mixer MIX. The intermediate frequency ZF is applied and can be tapped at the output of the mixer MIX.

To calibrate the entire circuit, a calibration signal CAL is overlayed in each channel K on the received signal RF at the output of the antenna element ANT. This overlay usually takes place by means of a coupler KOP which can be, for example, a 3dB coupler. The calibration signal is generated centrally in a known circuit and is supplied by means of a distribution network VNK to the individual couplers KOP of the channels K.

To operate the mixers MIX, a local oscillator signal LO, which is generated centrally in a local oscillator, is supplied by another distribution network VNL to the mixers MIX of the individual channels K. The mixers MIX are therefore configured as so-called balanced mixers. The signal to be converted, that is, the received signal of the antenna element (ANT), also called useful signal, and the local oscillator signal LO can be supplied to the mixer MIX at two different gates.

The disadvantage of this interconnection is that the central local oscillator signal must be generated with a very high power when the number of channels is large. Another disadvantage is that, because of the two separate networks, a high interconnection complexity is necessary. This leads in particular in an antenna structure in planar technology to a construction of the antenna with a large number of printed circuit board planes (multilayer construction in strip line technology) [1]. Further disadvantages with respect to the production costs of the array antenna result from this.

It is therefore the object of the invention to disclose an active receiving array antenna with an interconnection which leads to a fundamental simplification of the antenna structure and which can be realized with a low quantity of printed circuit board planes.

In accordance with the invention, a common distribution network is provided for the central local oscillator and calibration signal, which is interconnected in such a way that the central oscillator and calibration signal are coupled into the circuit at the output of the receiving antenna element.

The weak received signal of the antenna element, the weak central calibration signal, and the stronger central local oscillator signal are therefore amplified in the preamplifier circuit of the invention. This provides the advantage that the level of the central local oscillator signal can be selected lower with respect to the state of the art, since the level of the local oscillator signal is increased in the circuit in accordance with the invention due to the preamplifier.

The amplification or the level of the central local oscillator signal is suitably selected so that the preamplifier does not go into saturation and therefore maintains its low noise factor. In this way, the amplification of the level of the central local oscillator signal brings about in particular a saturation of the stage connected downstream of the preamplifier through the preamplifier. This stage therefore shows non-linear properties, which, with a simultaneous presence of weak signals from the receiving antenna elements, a weak calibration signal, and the strong local oscillator signal, leads to the frequency conversion of the weak signals in the intermediate frequency range. The stage acts therefore as mixer with parametric mixing.

The mixer stage can furthermore be designed advantageously as an unbalanced mixer with additive mixing. Moreover, a bipolar or field effect transistor or a diode, for example, can be used in the mixer as parametrically controlled element. The advantage of an interconnection of the mixer as unbalanced mixer is that the useful signal and the local oscillator signal are supplied to the mixer at the same gate.

With the interconnection of the array antenna of the invention, it is possible to provide the local oscillator signal with a phase inversion between neighboring channels. This leads in particular to a partial cancellation of the signals emitted by the antenna when taking the undesirable emission of the local oscillator signal of the array antenna into consideration. Therefore, the emission of local oscillator signals can be reduced. This, however, can also be realized by additional filter elements in each antenna element itself.

The mixer can, however, also be configured advantageously as another amplifier stage, which can be operated as active mixer by means of operating voltages. In this way, the conversion behavior of the mixer can be optimized. The mixer can be practically interconnected with filter elements for the signal frequency (useful frequency) of the antenna elements, the local oscillator frequency, the intermediate frequency, and the image frequency [2].

A filter can be connected advantageously at the input of the mixer by means of which an image frequency signal generated in the circuit is filtered out, but instead the local oscillator and received signal are allowed to pass through. Furthermore, it is advantageously possible to connect another filter to the output of the mixer. By means of this filter it is possible to retrieve the intermediate frequency signal to the output of the mixer. The remaining signals are isolated by means of suitably selected impedances. The conversion behavior of the mixer is optimized in this way.

The filtering properties of the array antenna according to the invention can furthermore be expanded and used in the image frequency range for the suppression of the received power to realize a low noise sensitiveness and low (single sideband) noise factor of the receiving channels. The series connection of the amplifier stage and the mixer can also have a high attenuation of the intermediate frequency, whereby the reception of intermediate frequency signals can be suppressed.

Another advantage of the receiving array antenna of the invention is that, because of the common distribution network for the local oscillator and calibration signal, there can be a savings of printed circuit board planes when realizing the antenna structure in planar technology. The circuitry in accordance with the invention in the form of a series circuit of low-noise preamplifier and imbalanced mixer can result in a further savings of printed circuit board planes. This provides a further advantage with respect to decreased production costs.

The receiving array antenna of the invention can be used in receiving systems of satellite communication and radiometry, in particular because of the very low signal level and the very low signal dynamic. Other advantageous application fields are radio networks, for example, wireless LAN (local area network), mobile network with Space Division Multiple Access/SDMA technology (for example, smart antennas) as well as in radar sensors.

Other objects, advantages and novel features of the present invention will become apparent from the following detailed description of the invention when considered in conjunction with the accompanying drawings.

BRIEF DESCRIPTION OF THE DRAWINGS

Other advantageous embodiments of the array antenna in accordance with the invention are explained in more detail based on the drawings, wherein.

DETAILED DESCRIPTION OF THE PREFERRED EMBODIMENTS

Figure 1:
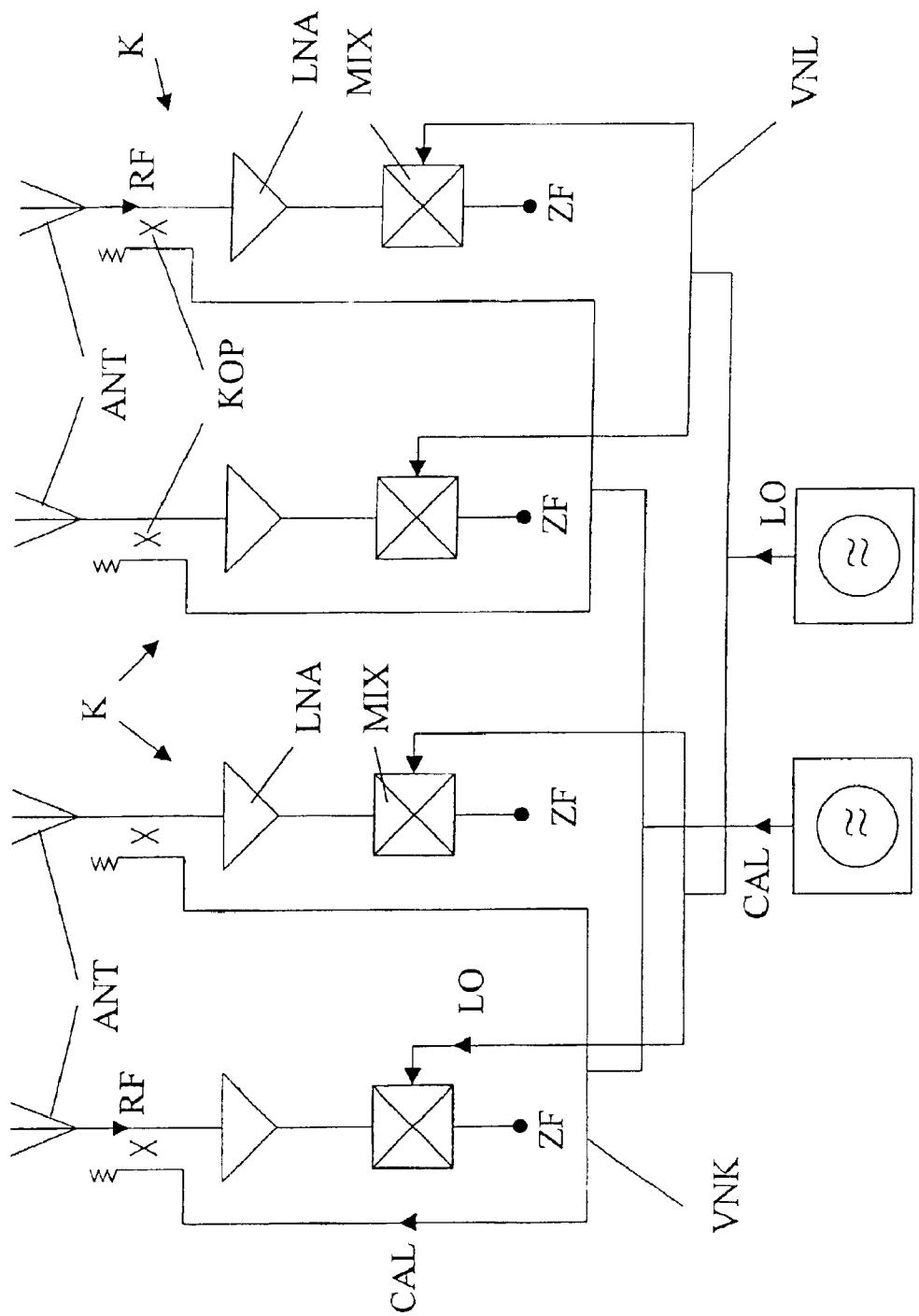
FIG. 1 shows a receiving array antenna with, for example, 4 channels in an interconnection according to the state of the art with separate distribution networks for the local oscillator and calibration signal.
Figure 2:
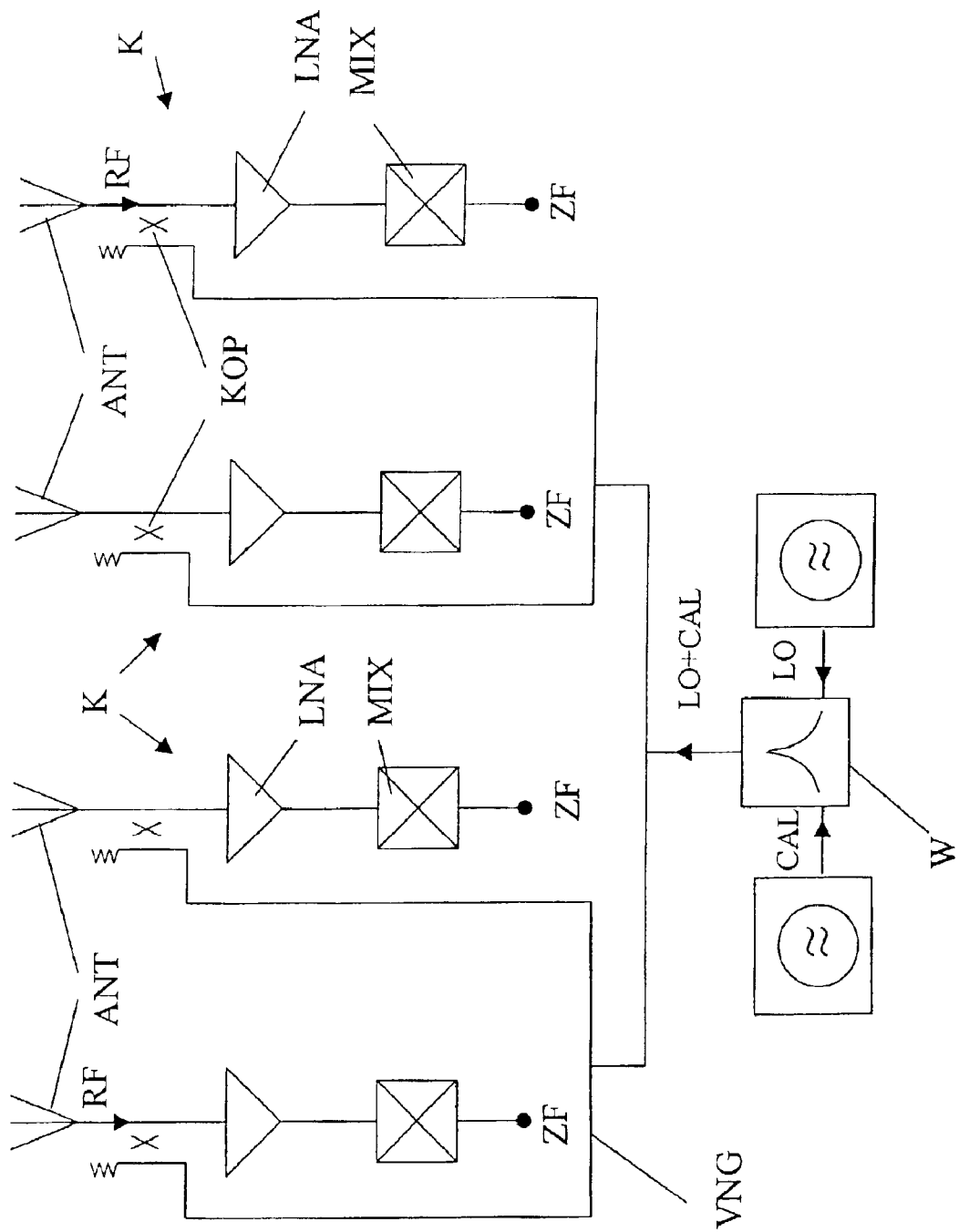
FIG. 2 shows a receiving array antenna with, for example, 4 channels in an interconnection in accordance with the invention with a common distribution network for the local oscillator and calibration signal.

FIG. 2 shows a receiving array antenna with, for example, 4 channels in an interconnection of the invention with a common distribution network for the local oscillator and calibration signal. Each channel K is configured in this order by a series circuit of an antenna element ANT, a coupler KOP, a low-noise amplifier LNA and a mixer MIX. The amplifier can, of course, consist of several amplifier stages.

The intermediate frequency signal ZF of the corresponding channel is tapped at the output of the mixer MIX. The individual couplers KOP of the channels K are connected to each other via a common distribution network VNG. In this distribution network VNG, a centrally generated calibration signal CAL and a local oscillator signal LO are supplied by means of a T-switch W.

Figure 3:
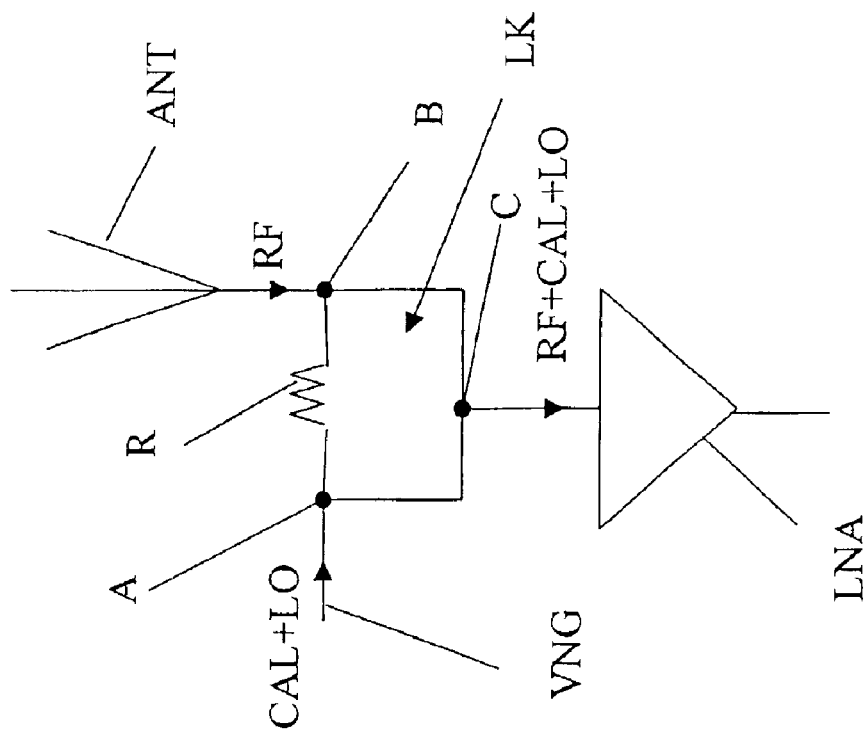
FIG. 3 shows a first advantageous embodiment of a coupling of the common distribution network for the local oscillator and calibration signal to the circuit for conversion of the received signal into an intermediate frequency signal.

A first advantageous embodiment for coupling the distribution network for the local oscillator and calibration signal to the circuit is shown in FIG. 3. The distribution network VNG is coupled By means of a Wilkinson power combiner LK. The Wilkinson power combiner LK is a port circuit, wherein the connection points A, B, C form the end points of a Y.

In the advantageous exemplary embodiment for coupling the distribution network for the oscillator signal LO and calibration signal CAL to the circuit shown in FIG. 3, the distribution network VNG is connected to point A of the power combiner LK. The antenna element ANT is connected to the point B of the power combiner LK. Point C of the power combiner LK is connected to the input of the preamplifier LNA. In addition, the connection points A and B of the power combiner LK are connected to each other via a resistance R.

The local oscillator signal LO and the calibration signal CAL from the distribution network VNG and the received signal RF from the antenna element ANT are therefore to be combined in point C of power combiner K and to be supplied to the input of the preamplifier LNA. The resistance R between the connection points A and B serves to attenuate the asymmetrical signal components generated during the combination of the signals. The advantage of this interconnection is that the distribution network VNG and the antenna element ANT are decoupled from each other, so that no signal component arrives from the power combiner LK in the direction of the antenna element ANT.

Figure 4:
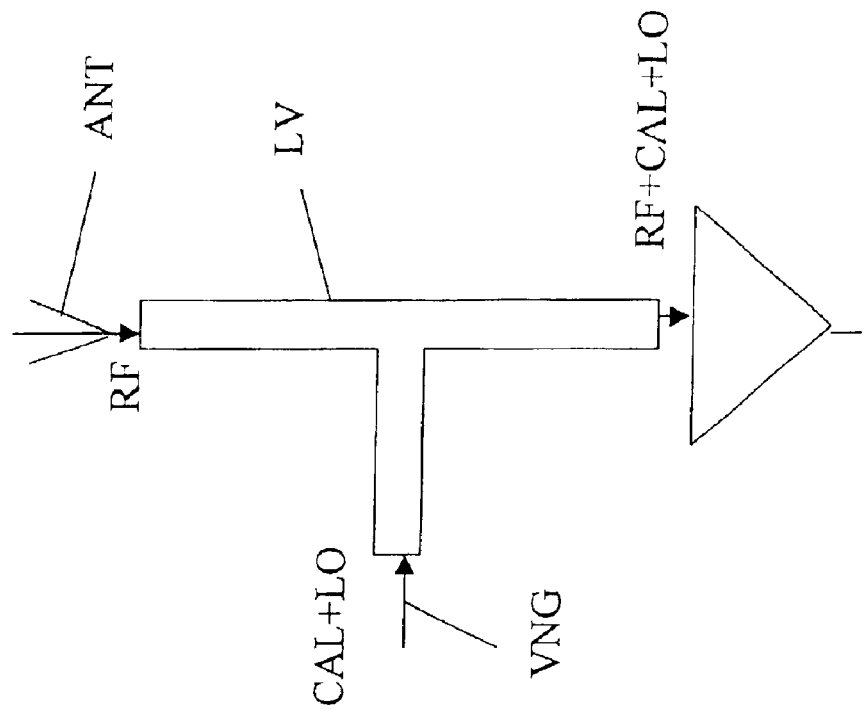
FIG. 4 shows a second advantageous embodiment of a coupling of the common distribution network for the local oscillator and calibration signal to the circuit for conversion of the received signal into an intermediate frequency signal.

FIG. 4 shows a second advantageous embodiment for coupling the distribution network VNG to the circuit for converting the received signal into an intermediate frequency signal (in the following designated as conversion circuit) The distribution network VNG is hereby coupled to the conversion circuit by means of a reactive power divider LV between the antenna element ANT and the first preamplifier LNA. The reactive power divider can therefore be, for example, a strip line, coaxial line or a hollow waveguide.

Another advantageous possibility is to connect a filter (not shown) between the antenna element (ANT) and the reactive power divider. This filter serves to suppress signal components of the local oscillator signal LO and calibration signal CAL running in the direction of the antenna element ANT.

Figure 5:
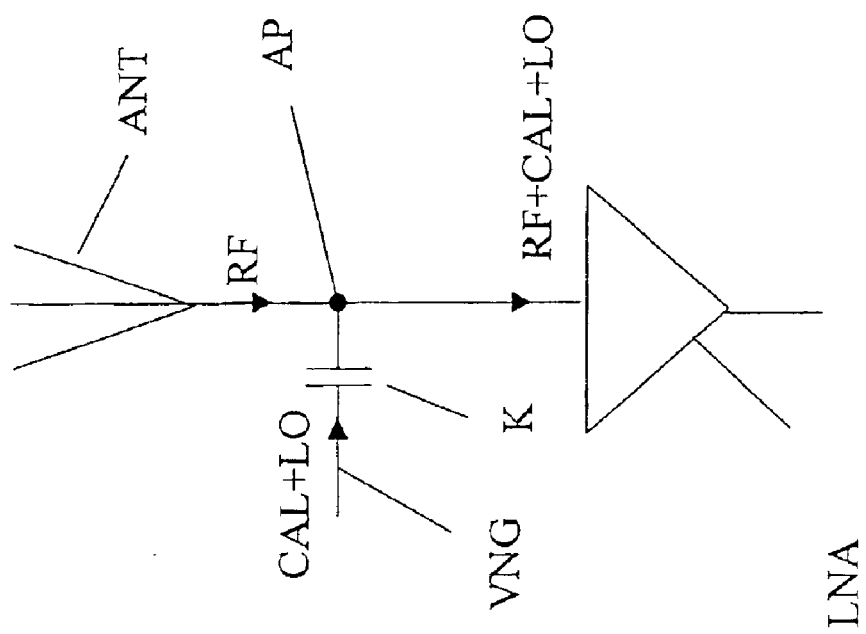
FIG. 5 shows a third advantageous embodiment of a coupling of the common distribution network for the local oscillator and calibration signal to the circuit for conversion of the received signal into an intermediate frequency signal.

A third advantageous embodiment for coupling the distribution network VNG to the circuit is shown in FIG. 5. Therein, the distribution network VNG is capacitively coupled, for example by means of a capacitor K, to the conversion circuit and in particular between the antenna element ANT and the first preamplifier LNA. For the reasons described with respect to FIG. 4, it is also possible to connect herein a filter (not shown) between the antenna element ANT and the coupling point AP.

Figure 6:
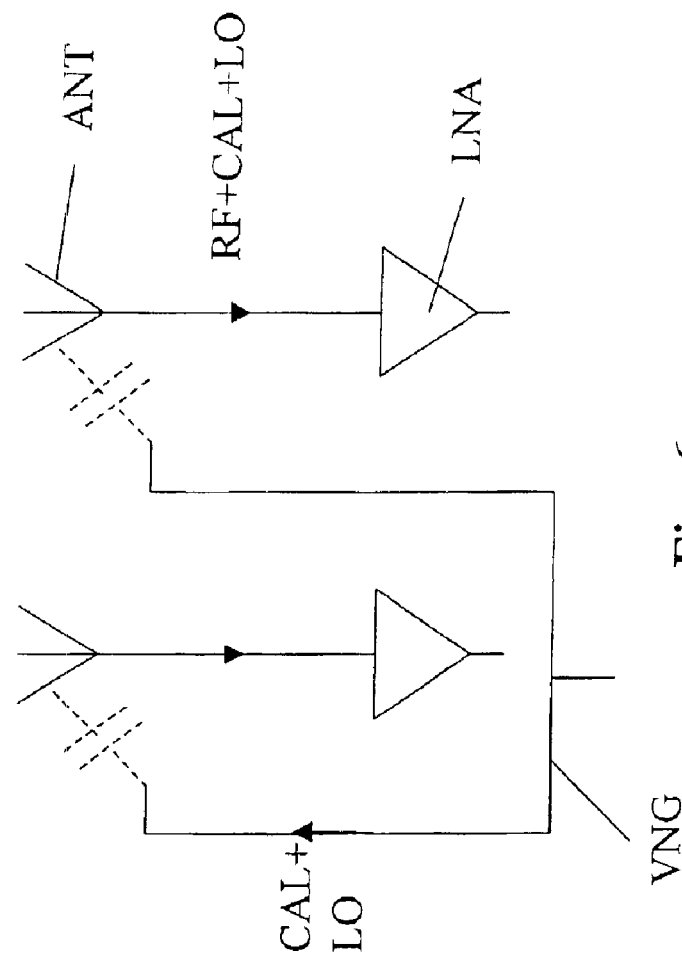
FIG. 6 shows a fourth advantageous embodiment of a coupling of the common distribution network for the local oscillator and calibration signal to the circuit for conversion of the received signal into an intermediate frequency signal.

In a fourth advantageous embodiment for coupling the distribution network VNG for the local oscillator and calibration signal to the conversion circuit shown in FIG. 6, the distribution network VNG and the antenna element ANT are coupled together electromagnetically. The electromagnetic coupling is shown via a dash-lined capacitance symbol in FIG. 6.

Figure 7:
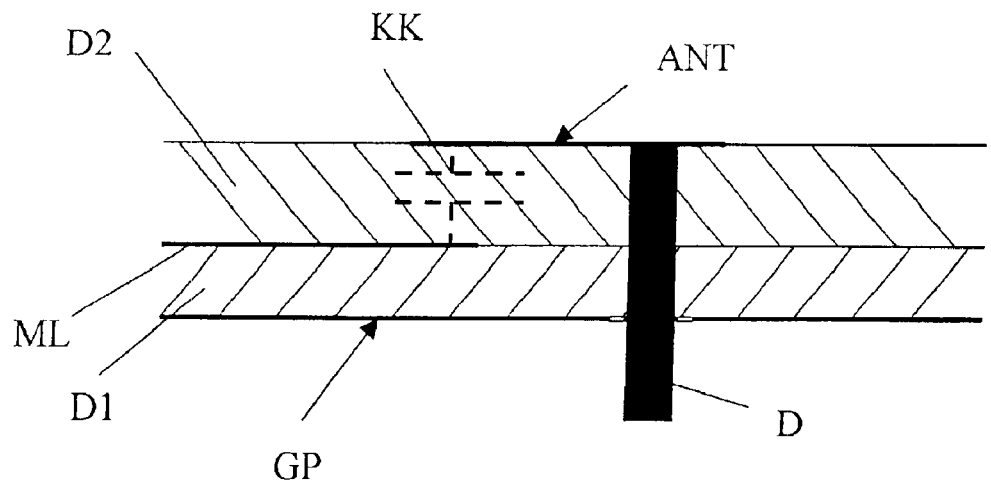
FIG. 7 shows a section of an exemplary embodiment of an antenna structure realized in a multilayer structure.

FIG. 7 shows how the coupling may be accomplished by a multilayer antenna structure. On a metallic base plate GP a first layer D1 and a second layer D2 of dielectric material are mounted. A micro strip line ML is mounted on the layer D1 that is connected to a not shown distribution network. On the second layer D2 is mounted a flat antenna element ANT, which is also called a patch emitter. The two layers D1, D2 and the base plate GP have a conductive perforation D, which serves for guiding the signals received by the antenna element ANT to further circuits, which are not shown.

The micro strip line ML on the first layer D1 and the antenna element ANT mounted on the second layer D2 are therefore oriented with respect to each other so that the micro strip line ML and the antenna element ANT are separated from each other via the layer D2, but at a distance which is as short as possible. In this way, a coupling capacitance KK in the second layer D2 is formed, whereby the micro strip line ML (and therefore the distribution network) is coupled to the antenna element ANT.

Figure 8:
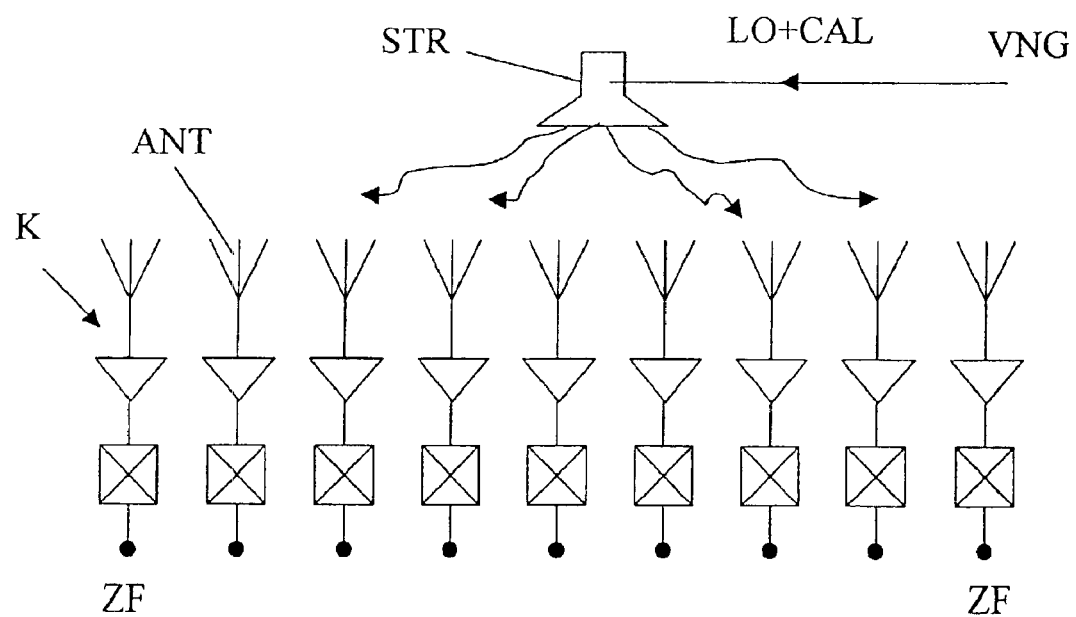
FIG. 8 shows an advantageous embodiment for feeding emissions of the local oscillator and calibration signal into the antenna elements.

Another advantageous embodiment for coupling the local oscillator and calibration signal into the circuit is shown in FIG. 8. For this purpose, the distribution network VNG is connected to an emitter element STR, for example, a horn emitter. The emitter element STR is therefore oriented directly toward the antenna elements ANT of the receiving array antenna. The local oscillator signal LO and the calibration signal CAL can be irradiated directly into the antenna elements ANT by means of the emitter element STR. An uneven distribution of the signal coupling and polarization mismatch can be acceptable within wide ranges since the effective noise factor of the individual channels K depends only slightly on the height of the local oscillator signals LO. On the other hand, a deviation occurring during the mix amplification (not shown) due to subsequent signal processing (beam forming), which is not shown, can be compensated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Literature
[1] A Dreher, T. Hekmat, N. E. Niklasch, M. Lieke, F. Klenfez, and A. Schroth, "Planar Digital-Beam Forming Antenna for Satellite Navagation," in IEEE MTT-S Int. Microwave Symp. Dig., Anaheim, Calif., Jun. 1999, pp. 647–650.
[2] Stephen A. Maas: "The RF and Microwave Circuit Design Cookbook," 1998, Archtech House, ISBN 0-89006-973-5, Chapter 6 (Active Mixers).

What is claimed is:

1. A receiving array antenna system for converting received signals from a plurality of receiving antenna elements into a corresponding plurality of intermediate frequency signals, said system comprising:
   a plurality of channels corresponding to said plurality of receiving antenna elements wherein each of said plurality of channels includes one of said plurality of receiving antenna elements and, a preamplifier connecting in series with a mixer wherein an output of said mixer provides one of said plurality of intermediate frequency signals;
   a circuit outputting a centrally generated local oscillator signal and a calibration signal; and
   a common distribution network receiving said centrally generated locally oscillator signal and said calibration signal for coupling said central local oscillator signal and said calibration signal into each of said plurality of channels at an output of each of said plurality of receiving antenna elements.

2. The system according to claim 1, wherein the mixer is an amplifier stage, which is operated as active mixer by means of its operating voltage.

3. The system according to claim 1, wherein the mixer is an unbalanced mixer with additive mixing.

4. The system according to claim 1, further including a filter connected between the first preamplifier (LNA) and the mixer of each cannel.

5. The system according to claim 1, further including a filter connected between the antenna element and the coupler, by means of which the central local oscillator signal and calibration signal is coupled into the circuit.

6. The system according to claim 1, wherein the central local oscillator signal and calibration signal are coupled into the circuit by means of a power combiner arranged between the antenna element and the first preamplifier.

7. The system according to claim 1, wherein the central local oscillator signal and calibration signal is coupled into the circuit by means of a reactive power divider located between the antenna element and the first preamplifier.

8. The system according to claim 1, wherein the central local oscillator signal and calibration signal are coupled into the circuit by means of a capacitive coupling at a connecting line between the antenna element and the first preamplifier.

9. The system according to claim 1, wherein the central local oscillator signal and calibration signal are coupled into the circuit by means of an electromagnetic coupling between the antenna element and the distribution network.

10. The system according to claim 1, wherein a radiator for irradiating the central local oscillator signal and calibration signal into the antenna element is connected to the distribution network.

11. The system according to claim 1, wherein a filter is connected at the output of the mixer for coupling out the intermediate frequency signal of each of said channels.

12. A use of an antenna system according to claim 1, in receiving systems of at least one of satellite communications, radiometry, communications systems, and radar sensors.

13. The use of an antenna according to claim 12, wherein said communication systems include one of radio networks and mobile communication.

* * * * *